United States Patent
Klein et al.

[11] Patent Number: 6,045,859
[45] Date of Patent: Apr. 4, 2000

[54] METHOD FOR THE COLORING OF CERAMIC SURFACES

[75] Inventors: Thomas Klein, Heidelberg; Thomas Staffel, Gruenstadt; Lysander Fischer, Rauenberg; Richard Walter, Alzenau; Peter Patzelt, Aschaffenburg, all of Germany

[73] Assignee: BK Giulini Chemie GmbH & Co. OHG, Ludwigshagen/Rhein, Germany

[21] Appl. No.: 09/077,751

[22] PCT Filed: Nov. 30, 1996

[86] PCT No.: PCT/EP96/05312

§ 371 Date: Nov. 12, 1998

§ 102(e) Date: Nov. 12, 1998

[87] PCT Pub. No.: WO97/21646

PCT Pub. Date: Jun. 19, 1997

[30] Foreign Application Priority Data

Dec. 12, 1995 [DE] Germany .......................... 195 46 325

[51] Int. Cl.$^7$ .................................................. B05D 3/02
[52] U.S. Cl. .............................................. 427/229
[58] Field of Search .............................................. 427/229

[56] References Cited

U.S. PATENT DOCUMENTS

| | | | |
|---|---|---|---|
| 4,880,464 | 11/1989 | Ushio et al. | 106/1.05 |
| 5,202,151 | 4/1993 | Ushio et al. | 427/98 |
| 5,589,273 | 12/1996 | Dorbath et al. | 428/433 |
| 5,639,901 | 6/1997 | Schulz et al. | 556/113 |
| 5,707,436 | 1/1998 | Fritsche et al. | 106/403 |

FOREIGN PATENT DOCUMENTS

| | | |
|---|---|---|
| 0219788 | 4/1987 | European Pat. Off. . |
| 2445537 | 4/1976 | Germany . |
| 0224026 | 6/1985 | Germany . |
| 4122131 | 7/1992 | Germany . |
| 4320072 | 5/1994 | Germany . |
| 4411103 | 5/1995 | Germany . |
| 4411104 | 5/1995 | Germany . |

*Primary Examiner*—Shrive Beck
*Assistant Examiner*—Jennifer Calcagni
*Attorney, Agent, or Firm*—Venable; George H. Spencer; Ashley J. Wells

[57] ABSTRACT

The present invention relates to a method for coloring ceramic surfaces, wherein the surfaces are treated with an aqueous solution of alkali metal or ammonium dithiosulphatoaurate(I) with a gold concentration of 0.1–10% by weight, the water is evaporated and the dithiosulphatoaurate(I) is decomposed at temperatures of 300–1400° C.

19 Claims, No Drawings

METHOD FOR THE COLORING OF CERAMIC SURFACES

BACKGROUND OF THE INVENTION

1. Field of the Invention

The subject-matter of the present invention relates to a new method for coloring ceramic surfaces by using the aqueous solution from a gold compound.

2. Description of the Related Art

The production of pink color shades has proven to be relatively problematic for the ceramic industry. It is standard practice to produce pigment colors by sintering together the most varied metal oxides and applying these to the ceramic surface with boric acid as fluxing means.

The reference DD 224026, for example, describes a "pink coloring element" with the approximate composition: 2 $CaCO_3 \times SnO_2 \times 2SiO_2 \times H_3BO_3$ and containing 0.1–1.5% $Cr_2O_3$ as color-causing component.

Such pigment powders have the disadvantage that they must either be added to the total ceramic mass, making it impossible to add a pattern, or that they are applied only as a thin layer to the ceramic surface and thus change the ceramic surface, so that a subsequent treatment of the surface is no longer possible.

It is furthermore known that colloidal gold, which is stabilized through tin oxide, results in dark ruby-red to lilac-red color shades (Cassius gold purple). The admixture of this gold purple to glasses and glazes consequently results in correspondingly ruby-red to lilac-colored glasses (gold ruby glass) and glazes (S. Stephanov et al. Ceramic Glazes, Wiesbaden/Berlin 1988, page 127).

It is furthermore known that when gold sulphoresinates, suspended in an organic solvent, are applied to a ceramic surface and are fired at 500–800° C., this results in a thin coating of metallic gold with a typical gold luster (compare DE-C1-41 22 131).

According to the DE-C1 43 20 072, diluted, aqueous solutions of gold salts, particularly gold chlorides such as gold(III)-chloride or tetrachloro gold acid, which can be obtained commercially as monohydrate and trihydrate, can be used to color in the surfaces of ceramic bodies, such as tiles or porcelain. A pink to blue coloration is obtained in a very simple way by calcining the surface of the ceramic body, colored in this way.

The disadvantage of this method is that the gold salt solutions used are not stable under normal storage and processing conditions and react in particular with metallic surfaces in the devices used and with reducing impurities or additives by forming amorphous gold, which is precipitated out as "slurry."

The object of the invention therefore was to find a new method for coloring ceramic surfaces, particularly coloring with pink color shades, which method allows the introduction of color at a later date to the surface layer of the ceramic material and the coloring of this surface layer to a depth of about 0.5–2 mm, so that it is possible to apply a pattern as well as use a subsequent treatment on the surface. A stable, non-toxic gold compound is to be used for the method.

SUMMARY OF THE INVENTION

The solution is with the features specified in the main claim, as well as the features specified in the dependent claims.

In accordance with the invention, the method representing the solution is characterized in that the surfaces are treated with an aqueous alkali metal or ammonium dithiosulphatoaurate(I) solution with a gold concentration of 0.1–10% by weight, that the water is evaporated and the dithiosulphatoaurate(I) is decomposed at temperatures of 300–1400° C.

DESCRIPTION OF THE PREFERRED EMBODIMENTS

A dithiosulphatoaurate(I) solution with a gold concentration of 0.5–5.0% by weight is preferred for the method.

The method has proven particularly successful if the decomposition of the alkali metal or ammonium dithiosulphatoaurate(I)—in the following mostly referred to as thiosulphatoaurate—takes place at temperatures of 800–1200° C., especially at 1140° C.

With the method according to the invention, the aqueous solution of the thiosulphatoaurate can be applied in the standard way through spraying, submerging, painting, printing, etc. to the ceramic bodies to be colored.

Following the drying, the ceramic bodies are fired in a suitable kiln at a defined temperature at 300–1400° C., preferably at approximately 800–1200° C., and especially for producing a pink coloration at 1140° C., wherein the firing period can last from about one half hour to five hours, but lasts preferably two hours. The firing pyrolizes the thiosulphatoaurate, and finely distributed elementary gold is formed. The size and distribution of the gold particles are critical for the color impression. This is controlled through the firing temperature and length of time for firing. At temperatures of approximately 300–400° C., the resulting color shade is blue and at temperatures of 400–1000° C. it changes over to lilac, only to result in a pure pink shade at temperatures above 1000° C. The gold concentration of the thiosulphatoaurate solution is also important, since the color shade becomes too pale below approximately 0.1% by weight gold and above 10% by weight gold, the color impression after the firing for metallic, amorphously distributed gold changes to a typical brown shade. A range of 0.3–5% by weight gold in the thiosulphatoaurate solution is therefore preferred.

Surprisingly, the alkali metal and ammonium thiosulphatoaurate(I) complexes can be pyrolized under the same conditions as gold(III) chloride. They are resistant to reducing agents such as metallic iron, so that it is possible to use equipment made from iron or iron alloys, such as frames, strainers, jets.

The color impression after the firing can be reproduced objectively with the aid of a La*b* system. In this system, L stands for the brightness, whereas a* and b* indicate the color shade as well as the saturation.

In this case, a* designates the position on a red-green-axis and b* the position on a yellow-blue-axis.

Exemplary Embodiments for the Method According to the Invention Solutions Used:

Solution I

The solution I is a preparation containing water and
6.0 g/l gold as sodium dithiosulphatoaurate(I)
40.0 g/l sodium thiosulphate
8.0 g/l disodium hydrogen phosphate
8.0 g/l sodium dihydrogen phosphate
14.0 g/l potassium peroxo monosulphate and
8.5 g/l ethylene diamine tetra-acetic acid, tetrasodium salt The solution has a gold concentration of 0.6% by weight and a pH value of 6.0.

Solution II:

The solution II is a preparation of water and
6.0 g/l gold as sodium dithiosulphatoaurate(I) and
40.0 g/l sodium sulphite The solution II has a gold concentration of 0.6% by weight and a pH value of 9.8.

Solution III:

The solution III is a preparation of water and
6.0 g/l gold as sodium dithiosulphatoaurate(I)
40.0 g/l sodium sulphite and ammonium hydroxide up to a pH value of 11.4.

The gold concentration for solution III is 0.6% by weight

Tiles used

Villeroy & Boch, dark-firing, 54×54 mm (type 1)
Villeroy & Boch, light-firing, 45×45 mm
Villeroy & Boch, light-firing, 54×54 mm (type 2)

The following table 1 reflects the results of color measurements on tiles, which were sprayed with two thiosulphatoaurate solutions with a different composition, the solutions I and II, and were fired at three different final temperatures for 60 minutes (in this case, 0.06 g of the thiosulphatoaurate solution applied to 1 cm$^2$ of tile surface) With the final temperatures of 800° C. and 1140° C., a prefiring occurred respectively at 600° C. for 760 minutes to reduce the thermal stresses; at 400° C. the firing lasted for a total of 300 minutes. It turned out that the color impression changes from the low temperatures (blue) to the average temperatures (lilac) and to the high temperatures (pink).

The fired tiles are measured with a "Minolta" Chroma Meter CR-200 (absolute measurements, La*b* color system).

| Experiment 1 | Experiment 2 | Experiment 3 |
| --- | --- | --- |
| T1 = 400° C. | T1 = 600° C. | T1 = 600° C. |
| T2 = 400° C. | T2 = 800° C. | T2 = 1140° C. |
| time 1 = 240 min | time 1 = 360 min | time 1 = 360 min |
| time 2 = 60 min | time 2 = 60 min | time 2 = 60 min |

TABLE 1 results of the color measurements

| | large tiles | | | small tiles | | |
| --- | --- | --- | --- | --- | --- | --- |
| | L | a* | b* | L | a* | b* |
| blank test 400° C. | 71.26 | +4.32 | +10.43 | 79.83 | +1.74 | +8.20 |
| solution I 400° C. | 63.66 | +3.07 | +4.42 | 71.12 | +2.34 | +1.09 |
| solution II 400° C. | 61.90 | +2.65 | +3.36 | 70.99 | +2.25 | +0.84 |
| blank test 800° C. | 77.91 | +8.17 | 14.26 | 86.72 | +4.46 | +10.94 |
| solution I 800° C. | 68.89 | +9.48 | +5.68 | 75.12 | +6.13 | +0.41 |
| solution II 800° C. | 69.81 | +7.95 | +5.37 | 72.71 | +5.58 | −1.60 |
| blank test 1140° C. | 59.95 | +0.38 | +12.50 | 79.16 | +2.27 | +15.82 |
| solution I 1140° C. | 58.19 | +2.58 | +10.76 | 71.79 | +6.47 | +12.00 |
| solution II 1140° C. | 57.76 | +3.04 | +11.15 | 72.19 | +6.81 | +12.28 |

Additional color measurements were carried out on large tiles type 2 (firing temperature 1140° C.). Color differences in the blank tests were detected during this, which also effected the color shade of the colored tile. The tiles of the type 2 show a medium light basic color.

TABLE 2 results of the color measurements on type 2 tiles

| | L | a* | b* |
| --- | --- | --- | --- |
| blank test | 65.28 | +0.68 | +14.26 |
| solution 1 | 60.80 | +4.78 | +11.55 |
| solution 2 | 60.12 | +5.38 | +11.26 |

Surprisingly, the nature of the ceramic body appears to influence the coloration only slightly, since tiles and porcelain shards are colored in the same way under the same conditions for application and firing. As shown in table 2, a possible basic coloration of the shard is added to the color shade.

The colored ceramic layer has a thickness of approximately 0.5–2 mm, in particular about 1 mm, so that it is possible to sand off rough spots on the shards (approximately 0.3 to 0.5 mm) and polish the surface, without affecting the color impression. In particular with hard-fired tiles, products can be manufactured in this way, which are step-resistant and polished on the surface. Given the corresponding printing techniques, it is possible, for example, to produce floor tiles with a marbled effect, wherein the produced floor tiles are superior to real marble because of their strength and can be produced more economically.

Thiosulphatoaurate solutions, which contain additional stabilizers—particularly sulphites or thiosulphates—have proven to be particularly usable.

Sodium sulphite and a mol ratio of gold to sulphite of (0.1–3) to 10, preferably (0.5–2) to 10, and especially 1 to 10 in the solution have proven successful.

Determination of effective stabilizer concentration

An aqueous solution containing 6 g/l gold in the form of sodium dithiosulphatoaurate(I), $Na_3[Au(S_2O_3)_2]$ is produced. Following this, varied amounts of sodium sulphite are added to aliquot shares of the solution, and 5 ml each of the resulting solution are poured into a test tube. An iron nail is placed into each test tube. After 12 hours, a check is made to determine from which solutions gold has been precipitated out and what type of precipitation has occurred. The concentration of gold and sulphite in the solutions, the mol ratio of gold to sulphite and the observed gold deposits are combined in a table 3.

TABLE 3

| Gold concentration | | sulphite concentration | | mol ratio | gold precipitated out in the presence of an |
| --- | --- | --- | --- | --- | --- |
| [g/l] | [mol/l] | [g/l] | [mol/l] | gold:sulphite | iron nail |
| 6 | 0.03 | 0 | 0 | | voluminous, brown deposit |
| 6 | 0.03 | 10 | 0.08 | 3.8:10 | thick gilding with little brown deposit |
| 6 | 0.03 | 20 | 0.16 | 1.9:10 | gilding with very little brown deposit |
| 6 | 0.03 | 30 | 0.24 | 1.3:10 | thin gilding |
| 6 | 0.03 | 40 | 0.32 | 0.9:10 | no precipitation |

What is claimed is:

1. A method of coloring a ceramic surface, comprising the steps of:
   (a) providing an aqueous solution consisting essentially of water and a dithiosulfatoaurate (I) which is one of an alkali metal dithiosulfatoaurate (I) or an ammonium dithiosulfatoaurate (I), and having a gold concentration ranging from 0.1 to 10% by weight;
   (b) treating the ceramic surface with the aqueous solution;
   (c) evaporating the water; and
   (d) decomposing the dithiosulfatoaurate (I) by heating to a temperature ranging from 300 to 1400° C.

2. The method according to claim 1, wherein the gold concentration ranges from 0.5 to 5.0% by weight, and wherein treating the ceramic surface is accomplished by one of spraying, submerging, painting or printing.

3. The method according to claim 1, wherein decomposing the dithiosulfatoaurate (I) by heating is carried out at a temperature ranging from 800 to 1200° C.

4. The method according to claim 3, wherein decomposing the dithiosulfatoaurate (I) by heating is carried out at a temperature of 1140° C.

5. The method according to claim 1, wherein the aqueous solution has a pH value ranging from 6.0 to 12.

6. The method according to claim 5, wherein the aqueous solution has a pH value ranging from 10 to 12.

7. The method according to claim 1, consisting essentially of the steps recited.

8. The method according to claim 1, consisting of the steps recited.

9. A method of coloring a ceramic surface, comprising the steps of:
   (a) providing an aqueous solution consisting essentially of water, a dithiosulfatoaurate (I) which is one of an alkali metal dithiosulfatoaurate (I) or an ammonium dithiosulfatoaurate (I), and a stabilizer which is water soluble, and having a gold concentration ranging from 0.1 to 10% by weight;
   (b) treating the ceramic surface with the aqueous solution;
   (c) evaporating the water; and
   (d) decomposing the dithiosulfatoaurate (I) by heating to a temperature ranging from 300 to 1400° C.

10. The method according to claim 9, wherein the gold concentration ranges from 0.5 to 5.0% by weight, and wherein treating the ceramic surface is accomplished by one of spraying, submerging, painting or printing.

11. The method according to claim 9, wherein decomposing the dithiosulfatoaurate (I) by heating is carried out at a temperature ranging from 800 to 1200° C.

12. The method according to claim 11, wherein decomposing the dithiosulfatoaurate (I) by heating is carried out at a temperature of 1140° C.

13. The method according to claim 9, wherein the stabilizer is sodium sulfite.

14. The method according to claim 13, wherein gold and sulfite are present in the aqueous solution in a mol ratio ranging from 0.1:10 to 3:10.

15. The method according to claim 14, wherein gold and sulfite are present in the aqueous solution in a mol ratio ranging from 0.5:10 to 2:10.

16. The method according to claim 9, wherein the aqueous solution has a pH value ranging from 6.0 to 12.

17. The method according to claim 16, wherein the aqueous solution has a pH value ranging from 10 to 12.

18. The method according to claim 11, consisting essentially of the steps recited.

19. The method according to claim 11, consisting of the steps recited.

* * * * *